United States Patent Office 2,738,551
Patented Mar. 20, 1956

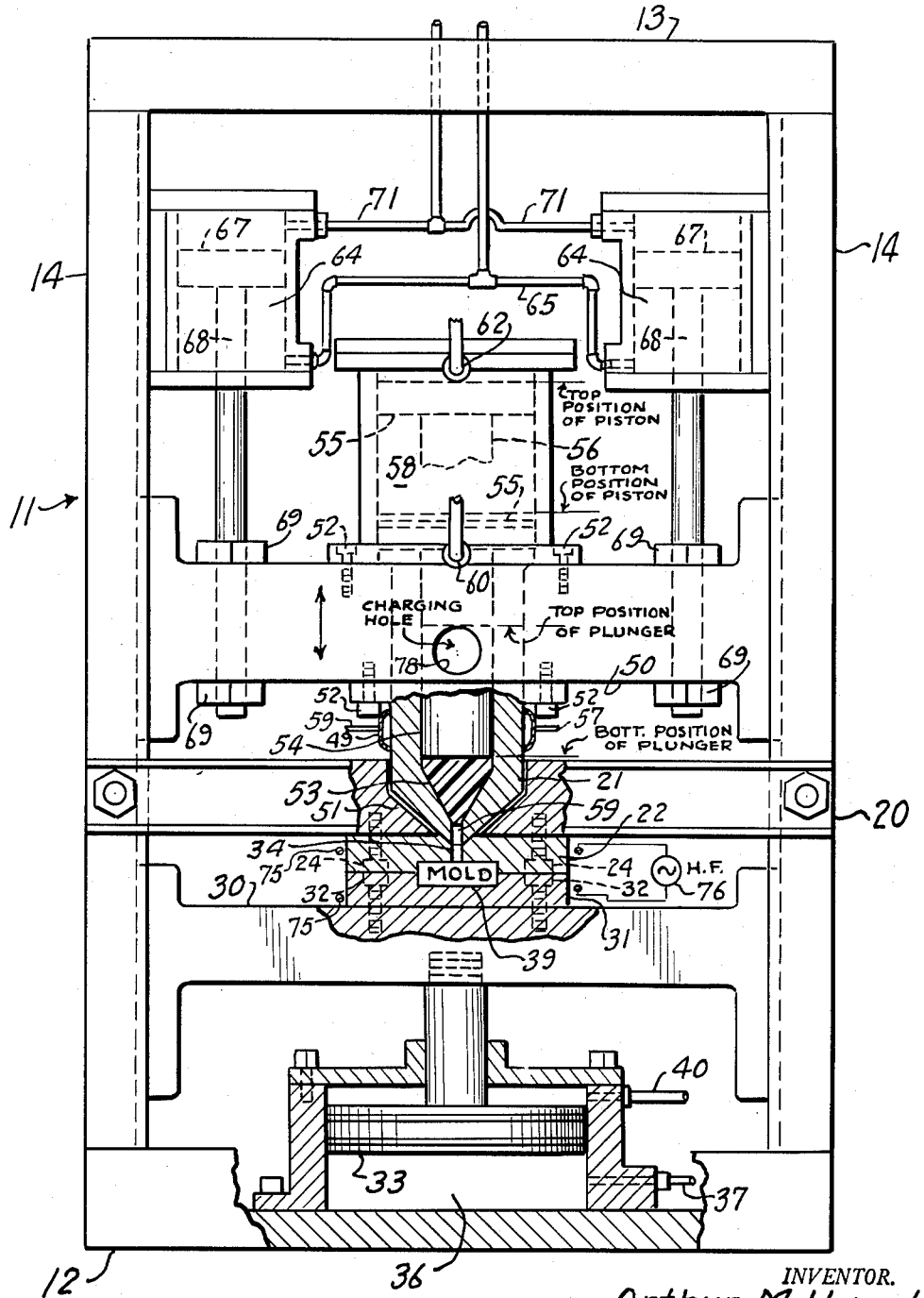

2,738,551

TRANSFER MOLDING METHOD

Arthur M. Howald, Perrysburg, Ohio, assignor to Glaskyd Incorporated, a corporation of Ohio Application April 26, 1952, Serial No. 284,618

4 Claims. (Cl. 18—55)

This invention relates to a transfer molding method, and, more particularly, to a transfer molding method adapted for the processing of molding compounds extrudable at a temperature below their minimum curing temperature.

Molding compounds having plasticity such that they are extrudable at temperatures below their minimum curing temperature are commercially available. Such materials have been used by various molders, particularly for the fabrication of special electrical products. Some such materials are particularly suited for this application because they can be molded under low pressures, so that they do not distort delicate mold inserts, and because they are made with polyester resins which, themselves, have good electric properties. Such resins have found relatively limited utility, almost entirely in the specialty field, because they are difficult to handle by conventional techniques. They have approximately the consistency of putty, and are not adapted, for that reason, to ordinary batching methods such as pilling. When they are molded by conventional methods, a great amount of hand work is required, and a large percentage of the material used is waste. Efforts have been made to produce granular polyester molding compounds in order to overcome the molding difficulties encountered with compounds having such plasticity characteristics. Even the granular materials currently available cannot be batched by pilling because of their sticky nature. Accordingly, the problem of molding polyester molding compounds is as yet unsolved.

Efforts have also been made to adapt transfer molding methods to the molding of thermosetting materials (see pages 258–263, "The New Plastics," Simonds and Bigelow, D. Van Nostrand Company, New York, New York, 1945). One suggested way of so adapting transfer molding involves the so called "jet" method where the molding compound is rapidly heated to a high temperature before injection into a mold. Difficulties are encountered in such techniques, however, e. g., in controlling the heating element. Such difficulties have, to date, militated against general use of "jet" molding.

The present invention is based upon the discovery of a method for molding polyester molding compounds, and similar materials, extrudable below their minimum curing temperature. The method of the invention, which takes advantage of the plasticity characteristic previously thought to be a shortcoming, can be practiced with relatively simple equipment, and is applicable for virtually automatic molding. Substantial savings in material and labor are effected when the present method replaces conventional molding techniques.

The principal object of the invention, therefore, is to provide an improved transfer molding method.

Other objects and advantages are apparent from the description which follows, and from the accompanying drawing, which shows diagrammatically a transfer molding press suitable for molding according to the present invention.

According to the invention a novel transfer molding method is provided. The method comprises forcing a molding compound extrudable at a temperature below its minimum curing temperature through an orifice maintained at a temperature from 20° C. to 70° C., and directly into a registering mold maintained at a temperature from 130° C. to 200° C.

An example of a molding compound suitable for transfer molding according to the method of the invention is a polyester resin filled with amphibole asbestos and Georgia clay disclosed in U. S. Patent No. 2,549,732. Molding compounds similar to that disclosed in the identified patent, but containing glass fibers as the only fibrous fillers have also been molded by the present method, and constitute preferred materials for such molding because of their greater strength in the cured condition. Any other molding compounds having plasticity characteristics such that they are extrudable below their minimum curing temperatures can be molded according to the method of the invention. Polyester molding compounds are preferred, however, because their properties make them particularly suitable for use in the manufacture of electrical parts, such as distributors for internal combustion engines, capacitors, and the like, and because the method of the invention is especially suited for the manufacture of such parts.

Referring now more particularly to the drawing, a transfer molding press indicated generally at 11 comprises a base member 12 and a crown 13, rigidly mounted uprights 14 attached to the base member 12 and to the crown 13, a cross member 20 rigidly attached to the uprights 14, a movable bed 30 slidably mounted between the uprights 14, and an upper slide member 50 mounted between the uprights 14. The cross member 20 carries a stationary upper mold half 22 rigidly attached thereto by bolts 24, and is provided with a seat 21 for an extrusion cylinder 51, the apex of the seat being in registry with the sprue hole of the upper mold half 22. It will be noted that the seat 21 is of larger diameter, throughout most of its depth, so that substantially line contact is provided between it and the extrusion cylinder 51.

The movable bed 30 carries a lower mold half 31 rigidly attached thereto by bolts 32, and is, in turn, attached to a piston 33 positioned in an operating cylinder 36. In the drawing the movable bed 30 is shown in its uppermost position, with the movable lower mold half 31 in registry with the stationary upper mold half 22 to form a complete mold. The mold is held in this position during molding by a hydraulic fluid under pressure admitted to the lower portion of the cylinder 36 through a line 37. The movable bed 30, and with it the lower mold half 31, are lowered from the position shown in the drawing by releasing the hydraulic fluid from the lower portion of the cylinder 36 through the line 37. This can be accomplished by any conventional way, not illustrated.

The movable bed 30 and the mold half 31 may be lowered from the position shown by the force of gravity upon release of pressure or, if desired, faster lowering can be achieved by admitting hydraulic fluid under pressure to the upper portion of the cylinder 36 through a line 40. The mold can then be raised, again, to the closed position, by releasing the pressure in the upper portion of the cylinder 36, and readmitting hydraulic fluid under pressure to the lower portion of the cylinder 36 through the line 37.

The upper slide member 50 carries the extrusion cylinder 51 rigidly attached thereto by bolts 52. A water jacket 49 provided with an inlet 57 and an outlet 59 surrounds the extrusion cylinder 51. For rapid operation in a hot pressroom it may be advantageous to circulate cooling water through the jacket to maintain the temperature of the extrusion cylinder within the stated limits.

However, it is ordinarily practical to mold a plastic molding compound without the use of cooling, and particular advantage resides in the feature of the method of the invention that the molding compound is not heated before or during extrusion into the mold. Most desirably the molding compound is placed in the extrusion cylinder as received by the molder, approximately at room temperature. In no case is it necessary that the material or the extrusion cylinder be preheated, although it will be understood that the spirit of the claims is not avoided by slight preheating of either. The interior of the extrusion cylinder 51 is provided with a tight fitting plunger 54 which can be raised or lowered by raising or lowering a piston 55 to which it is attached by a connecting rod 56. The piston 55 is raised by admitting hydraulic fluid under pressure to the lower portion of a cylinder 58 through a line 60. The cylinder 55 is then lowered by admitting hydraulic fluid under pressure to the upper portion of the cylinder 58 through a line 62 after pressure applied through the line 60 has been released. The two positions of the piston represented show the limits of its travel.

The upper slide member 50 is raised from the position shown in the drawing by admitting hydraulic fluid under pressure to the lower portions of lifting cylinders 64 through a line 65. The hydraulic fluid acts upon pistons 67, which are raised, and carry with them connecting rods 68 and the upper slide member 50, to which the connecting rods are rigidly attached by nuts 69. Similarly, the upper slide member 50 is lowered by releasing the hydraulic fluid under pressure from the line 65, and then admitting hydraulic fluid under pressure to the upper portions of the cylinders 64 through a line 71.

The mold can be heated in any convenient way, for example by passing steam through suitable jacketing, or by an electric current through a heating element 75 from a generator 76.

In order to carry out the transfer molding method of the invention in the press 11, a molding compound having the plasticity characteristics indicated is charged into the extrusion cylinder 51 as indicated at 53. This is accomplished by raising the piston 55, and with it the plunger 54, until the latter clears a charging opening 78 provided in the side of the extrusion cylinder 51, after which the molding compound may be introduced into the extrusion cylinder 51 through the opening 78. Upon lowering of the piston 55 and of the plunger 54, the charging opening 78 is covered and molding material 53 is extruded from the extrusion cylinder 51 through an orifice 59 at the lower extremity thereof.

Molding material passes from the orifice 59 into a sprue hole 34 in the upper mold half 22, and from thence into a mold cavity 39 formed partially by the upper mold half 22, and partially by the lower mold half 31. Pressure from the piston 55, transmitted through the connecting rod 56, the plunger 54, and molding material 53 maintains the material in the mold under compression during curing. After from about 5 seconds to about 10 seconds in the mold cavity 39 a polyster molding compound of the type indicated above has cured sufficiently that a molded piece no longer needs to be maintained under compression. Accordingly, pressure in line 62 can then be lowered and the upper slide member 50 can be raised so that the injection head no longer engages its seat in the fixed cross member 20. The partially cured molding remains in the mold cavity 39 for an additional time, usually from one to two minutes, in order to complete polymerization thereof. When polymerization is substantially complete the movable bed member 30 may be lowered to separate the two mold halves 22 and 31, and the molded piece removed for finishing operations.

It will be apparent that the method of the invention is readily adapted to substantially continuous operation. Since it is necessary that a part being molded according to the method of the invention be maintained under compression for only a relatively short period of time, it is practical to provide a dial type feed wherein a dial carrying a plurality of molds replaces the fixed member 20 and successively positions molds under an extruder and above a ram, substantially as illustrated in the drawing. After filling of the mold cavity, and maintaining the molding under pressure, as described, for 5 to 10 seconds, the ram is lowered, and the extruder raised; the dial then rotates, positioning the next mold under the extruder and above the ram. The mold halves are held together on the dial by any suitable, readily releasable clamp.

Having described the invention, I claim:

1. A transfer molding method which comprises placing a quantity of a filled, polyster molding compound containing a suitable polymerization catalyst and extrudable at a temperature below its minimum curing temperature in a receptacle provided with an orifice and maintained at a temperature of from 20° C. to 70° C., effecting relative movement between the receptacle and a mold having a sprue hole and maintained at a temperature of from 130° C. to 200° C., to bring the orifice into registry with the sprue hole, filling the mold by forcing molding compound from the receptacle into the mold, maintaining the molding compound in the mold under compression for from five to ten seconds by exerting a force on the molding compound in the receptacle tending to extrude molding compound therefrom, effecting relative movement between the receptacle and the mold to separate the orifice from the sprue hole, and maintaining the molding compound in the mold, while the orifice is separated from the sprue hole, for an additional period of time to effect further cure thereof.

2. A transfer molding method which comprises placing a quantity of a filled, polyester molding compound containing a suitable polymerization catalyst and extrudable at a temperature below its minimum curing temperature in a receptacle provided with an orifice and maintained at a temperature of from 20° C. to 70° C., effecting relative movement between the receptacle and a mold having a sprue hole and maintained at a temperature of from 130° C. to 200° C., to bring the orifice into registry with the sprue hole, filling the mold by forcing a portion of the molding compound from the receptacle into the mold, maintaining the molding compound in the mold under compression for from five to ten seconds by exerting a force on the molding compound in the receptacle tending to extrude molding compound therefrom, effecting relative movement between the receptacle and the mold to separate the orifice from the sprue hole, and maintaining the molding compound in the mold, while the orifice is separated from the sprue hole, for an additional period of time to effect further cure thereof.

3. A transfer molding method which comprises placing a quantity of a filled, polyester molding compound containing a suitable polymerization catalyst and extrudable at a temperature below its minimum curing temperature in a receptacle provided with an orifice and maintained at a temperature at which the molding compound is extrudable but does not cure rapidly, effecting relative movement between the receptacle and a mold having a sprue hole and maintained at a suitable curing temperature for the molding compound to bring the orifice into registry with the sprue hole, filling the mold by forcing molding compound from the receptacle into the mold, maintaining the molding compound in the mold under compression by exerting a force on the molding compound in the receptacle tending to extrude molding compound therefrom for a time insufficient to effect complete cure of the molding, effecting relative movement between the receptacle and the mold to separate the orifice from the sprue hole, and maintaining the molding compound in the mold, while the orifice is separated from the sprue hole, for an additional period of time to effect further cure thereof.

4. A transfer molding method which comprises placing a quantity of a filled, polyester molding compound containing a suitable polymerization catalyst and extrudable at a temperature below its minimum curing temperature in a receptacle provided with an orifice and maintained at a temperature of from 20° C. to 70° C., effecting relative movement between the receptacle and a mold having a sprue hole and maintained at a temperature of from 130° C. to 200° C., to bring the orifice into registry with the sprue hole, filling the mold by forcing molding compound from the receptacle into the mold, maintaining the molding compound in the mold under compression by exerting a force on the molding compound in the receptacle tending to extrude molding compound therefrom for a time insufficient to effect complete cure of the molding, effecting relative movement between the receptacle and the mold to separate the orifice from the sprue hole, and maintaining the molding compound in the mold, while the orifice is separated from the sprue hole, for an additional period of time to effect further cure thereof.

References Cited in the file of this patent

UNITED STATES PATENTS

| | | |
|---|---|---|
| Re. 22,899 | Tucker | July 15, 1947 |
| 2,322,310 | Muskat et al. | June 22, 1943 |
| 2,430,033 | Stacy et al. | Nov. 4, 1947 |